United States Patent [19]

Kirchoff et al.

[11] 4,203,787
[45] May 20, 1980

[54] PELLETIZABLE, RAPID AND COOL BURNING SOLID NITROGEN GAS GENERANT

[75] Inventors: George F. Kirchoff; Fred E. Schneiter, both of Brigham City, Utah

[73] Assignee: Thiokol Corporation, Newtown, Pa.

[21] Appl. No.: 970,602

[22] Filed: Dec. 18, 1978

[51] Int. Cl.² .............................................. C06B 35/00
[52] U.S. Cl. ...................................... 149/35; 149/22; 149/71; 252/181.4
[58] Field of Search ............................ 149/35, 22, 37; 252/181.4

[56] References Cited

U.S. PATENT DOCUMENTS

| | | | |
|---|---|---|---|
| 3,895,098 | 7/1975 | Pietz | 149/35 |
| 3,931,040 | 1/1976 | Breazeale | 149/35 X |

Primary Examiner—Stephen J. Lechert, Jr.
Attorney, Agent, or Firm—Stanley A. Marcus; Royal E. Bright

[57] ABSTRACT

Mixtures of alkali metal azides, metal and metalloid oxides, molybdenum disulfide and optionally sulfur are easily pressed into pellets, are rapid, stable and cool burners and give high purity cool nitrogen gas. The compositions are useful in applications such as automotive crash bag inflators and the like.

7 Claims, 5 Drawing Figures

PELLETIZABLE, RAPID AND COOL BURNING SOLID NITROGEN GAS GENERANT

BACKGROUND OF THE INVENTION

A. Field of the Invention

This invention relates to solid gas generants particularly those suitable for the production of substantially pure nitrogen gas, more particularly to the use of alkali metal azides as a base for such systems, processes for their preparation and use as well as to systems employing such gas generants in their operation.

B. Description of Prior Art

With the realization that in private automotive vehicles crash restraint systems requiring positive effort on the part of the user for effectiveness were ignored by a substantial portion of the population intended to be protected, professional and governmental safety programs have tended to emphasize automatic restraint systems, such as crash bags.

The details of crash bag systems have been widely discussed, as have the reasons for selection of pyrotechnic devices when rapid dependable gas supplies therefore are required. The operational constraints of crash bags are also well known. The system must supply absolutely non-toxic gas to inflate the bag because some bag systems vent into the passenger compartment on deflation and because of the very real probability of bag rupture in an actual crash situation. Naturally the gas must inflate the bag at a temperature which the beneficiaries of the protection can tolerate. The time period for attainment of maximum inflation has been determined to be from 20 to 100 milliseconds, preferably 20 to 60 milliseconds. The device must be safe to handle and store prior to production. It must be adaptable to mass production line installation techniques and not introduce an unreasonable hazard then or during the life of the vehicle. It must assure reliable operation during the life of the vehicle containing it, which may be 10 years or longer.

The objectives of rapid generation of cool non-toxic inflation gas and long-term operability depend to a large extent on the gas generant selected and the physical form into which it is initially compounded.

If a suitable propellant can be designed, then the design of a complete passive restraint system undertaken with consideration of the characteristics of a particular propellant stands a better chance of practical success.

Naturally, from every point of view, the most desirable atmosphere inside an inflated crash bag would correspond in composition to the air outside it. This has thus far proven impractical of attainment. The next best solution is inflation with a physiologically inert or at least innocuous gas. The most practical of these gases has proven to be nitrogen. The most popular means of generating nitrogen has been the decomposition of alkali metal, alkaline earth metal and aluminum derivatives of hydrazoic acid, especially sodium azide.

Decomposition of these azides in the absence of other ingredients can only be accomplished by means of a high heat source and the decompositions are not self-sustaining. So as to provide favorable kinetic conditions for the decomposition, various co-reactants have been suggested. It is evident that such co-reactants must be selected to provide that the non-gaseous decomposition products are capable of containment or easily converted to manageable form. Non-gaseous decomposition products being those which may be solid or liquid at 25° to 40° C. Among the by products of the decomposition which must be contained or converted to a containable form is the free metal derived from the counter-ion in the azide salt. A number of co-reactants to provide cool sustained combustion together with formation of little or no free counter-ion metal have been proposed. The most notable of these are ferric oxide (U.S. Pat. Nos. 4,062,708; 3,931,040; 3,996,079 and 3,895,098) and a mixture of molybdenum sulfide and sulfur (U.S. Pat. No. 3,741,585), both of which systems, while usable in crash restraints, have proven to have inherent disadvantages to their commercial practice.

The molybdenum disulfide sulfur systems burn with the requisite speed, give cool gas when employed in a container of proper design and can be easily pelletized to stable pellets which are abrasion and vibration resistant for the expected life of the inflators. They do present an odor problem apparently because of the presence of trace sulfur compounds in the gas, the solid combustion residue is finely divided making containment thereof a difficult engineering problem, and the gas is generated at high pressures, over 2,000 pounds per square inch absolute (psia), requiring heavy walled vessels for its containment. Iron oxide-azide systems on the other hand are extremely difficult to compact to stable pellets in actual practice, they are cool burning, but also generate their nitrogen at pressures over 2,000 psia and tend to be unstable and slow burners. Their residue on the other hand is described in the prior art as being in the form of large particles of "clinkers" that are simpler to contain, and having no sulfur, they are naturally free of any sulfur odor problem.

Containment of the hot combustion residues within the gas generator is necessary to prevent them from damaging the fabric of the gas bag itself and to prevent them from coming in contact with and injuring the occupants of the vehicle.

Those gas generants of the prior art which provide a finely divided combustion residue have been indicated in that art as requiring elaborate and for the most part expensive filtering devices. None of these devices has proven sufficiently attractive for commercial practice. The force of the combustion gases, particularly in the initial stages of combustion, results in a substantial pass through of high temperature particulates to the exterior of the gas generator. The U.S. Pat. No. 4,062,708 discloses that the compositions contained therein leave fused coherent combustion residues which are relatively easy to contain with relatively simple filtration means. The U.S. Pat. No. 3,996,079 also indicates that combinations of azides and iron or nickel oxides will form a sintered residue on combustion, thereby simplifying containment of said residue. Unfortunately, for the reasons discussed herein, simple azide-oxide systems have not as yet demonstrated commercial value as gas generants.

Azide-metal oxide systems are somewhat slower burning than azide-molybdenum disulfide-sulfur systems although combinations within at least the upper limits of the acceptable combustion rate range can apparently be formulated. The incorporation of metal oxides into azide-molybdenum disulfide-sulfur systems would appear on its face as a means to obtain more rapid burning and an easily trapped sintered residue. Surprisingly, while such a combination is rapid burning, it is also substantially cooler burning, has no substantial objectionable odor in the gas generated and in the absence of a properly designed container package, does not form a sintered residue. In the absence of such a sintered residue, the elaborate filtration and neutralization devices of the prior art are required for use of this type propellant as a crash bag inflator. However, when used in the specially designed gas generator of the hereinafter identified Adams-Schneiter application, the azide-metal oxide-molybdenum disulfide-sulfur generant compositions can be caused to form a sintered residue enabling simplified neutralization and filtration of the gas produced by their combustion.

The importance of pelletization will be immediately apparent to anyone who understands that, all else being equal, the surface area of a gas generant determines its gas production rate. This surface area depends on pellet size and for reproducibility must be uniform. In the absence of pelleting, routine handling will cause abrasion of individual particles changing the burn characteristics of a generant batch unpredictably. Long term vibration stresses will cause a generant which is a mixture of ground components to separate according to the density of individual components, again making performance unpredictable. The use of organic binders for pelleting, while convenient, is not acceptable to automobile manufacturers because the presence of carbon containing compounds immediately introduces carbon monoxide into the combustion gas and frequently the presence of compounds containing carbon, nitrogen and hydrogen will lead to formation of HCN.

The use of an inorganic lubricant and binder for pelleting is therefore indicated. A proven lubricant and binder is molybdenum disulfide. Simple replacement of a portion of the iron oxide of iron oxide azide systems with sufficient molybdenum disulfide for satisfactory pellet manufacture of even greater quantities is not a direct solution because the resultant compositions are either slow burning, difficult to ignite, or just marginally acceptable (burn rates on soda straw size strands of 0.7 in. per sec. at 1000 psia pressure). A number of sources, including U.S. Pat. No. 4,062,708, suggest that the inclusion of perchlorate accelerators in azide-iron oxide systems will increase the burn rate. Unfortunately, the formation of hydrogen chloride and chlorine is a known problem of perchlorates.

The present invention provides a gas generant consisting of a mixture of non-explosive azides, iron oxide, molybdenum disulfide and sulfur which is easily pelletizable, surprisingly cool burning, generates nitrogen at much lower pressure than any prior art gas generant, has burn rates well within acceptable limits, sustains burning reliably after ignition, has very little or no odor in the nitrogen generated, and in a properly designed container leaves a combustion residue which is principally an easily contained "clinker" or fused mass.

SUMMARY OF THE INVENTION

The invention provides in a composition aspect a solid nitrogen gas generant consisting of 60 to 80 weight percent alkali metal azide, 2 to 35 weight percent oxide selected from iron oxide, nickel oxide, palladium oxide, cobalt oxide, silicon oxide or mixtures thereof, 2 to 26 weight percent molybdenum disulfide and up to 6 weight percent sulfur.

The tangible embodiments of this composition aspect of the invention possess the inherent physical property of being readily mechanically compactable into stable tablets or pellets by conventional tableting or pelletizing techniques.

The tangible embodiments of this composition aspect of the invention possess the inherent applied use characteristics when in tablet or pellet form of being of uniform composition, of being physically and chemically stable at ordinary automotive operating temperatures including extremes thereof which the remainder of the vehicle may survive without substantial damage, of being insensitive to shock and vibration normally encountered during ordinary use; when exposed to an appropriate high temperature ignition source of burning rapidly and at relatively low pressure and temperature to generate nitrogen gas substantially free of odor and substantially free of noxious or toxic contaminants thereby evidencing usefulness in automotive vehicle passive restraint systems employing gas inflated cushions as restraining devices. The tangible embodiments of this composition aspect of the invention also possess the inherent applied use characteristic when employed as a tableted or pelleted gas generant in the gas generator described in copending application, Ser. No. 970,687, of Gary Adams and Fred Schneiter filed concurrently with this application of providing a "clinker" or sintered combustion residue which permits simplified trapping of the combustion residue and pH adjustment of effluent material from the combustion chamber.

Special mention is made of those embodiments of this composition aspect of the invention wherein the metal azide is sodium azide, and those wherein the oxide is iron oxide, preferably ferric oxide.

The invention also provides an improved nitrogen gas generator based on alkali metal azides containing reactants for combination with the free alkali metal liberated by decomposition of alkali metal azides to produce nitrogen wherein the improvement comprises the reactants for combination with said free alkali metals being a mixture of oxides selected from iron oxide, cobalt oxide, nickel oxide, palladium oxide, silicon oxide or mixtures thereof; molybdenum disulfide and sulfur.

The invention also provides a method for the generation of substantially pure and substantially particle free nitrogen gas at pressures below 1500 psia, where generation is initiated at normal room temperature, which comprises:

(a) treating a nitrogen gas generant composition consisting of 60 to 80 weight percent alkali metal azide, 2 to 35 weight percent oxide selected from iron oxide, cobalt oxide, nickel oxide, palladium oxide, silicon oxide or mixtures thereof; 2 to 26 weight percent molybdenum disulfide and up to 6 weight percent sulfur with hot combustion products of an igniter combustion mixture of 5 to 25 weight percent boron and 75 to 95 weight percent potassium nitrate, to which mixture is added 3 to 10 weight percent lead azide said hot composition products being of sufficient quantity to induce sustained combustion of said nitrogen gas generant composition; and (b) passing the products of combustion of said nitrogen gas generant composition through cooling, filtration and pH adjustment means.

Description of the Preferred Embodiment

Figure 1:
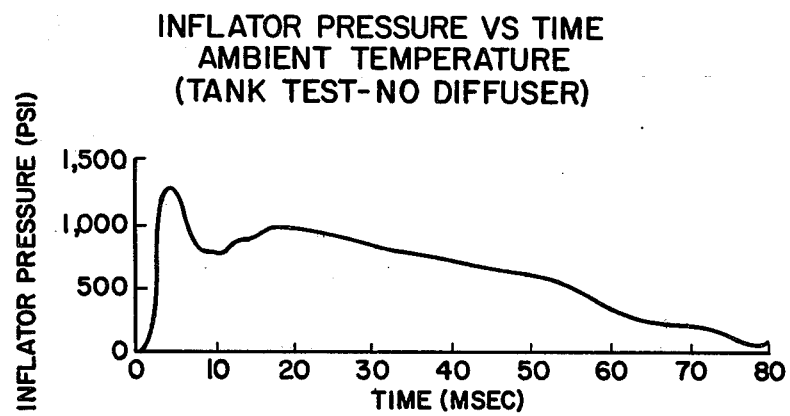
FIG. 1 is a representation of the pressure vs. time relationship obtained in the interior of a gas generator by burning the composition of Example 5 and expelling the gases into a static tank.

The manner of making and using the nitrogen gas generant compositions (I) of the invention will now be described with reference to a specific embodiment thereof, namely a nitrogen gas generant composition (Ia) consisting of sodium azide, ferric oxide, molybdenum disulfide and sulfur.

To prepare Ia, sodium azide, ferric oxide, molybdenum disulfide and sulfur, all of which are commercially available may be dry blended as powders by standard methods. The blended powder Ia, may, if desired for use where rapid, controlled, repeatable, and long term reliably accurate performance is intended, be compacted into tablets, granules or pellets by conventional techniques. For safety considerations as with most, if not all, pyrotechnic substances, remote handling is preferred. Conventional remote controlled tableting presses are convenient devices which may be employed for compression to tablets.

One skilled in the art will recognize that one may substitute other alkali metal azides for the sodium azide illustrated herein above, particularly lithium azide or potassium azide and that one may substitute other oxides of iron such as ferrous oxide (FeO) or magnetite ($Fe_3O_4$) as well as the common oxides of cobalt, nickel, and palladium, as well as, silicon dioxide or mixtures of any two or more oxides for the ferric oxide ($Fe_2O_3$) illustrated to prepare other compositions I equivalent to Ia.

The particle sizes of the azide, molybdenum disulfide and sulfur are not particularly critical and the commercially available materials sized as powders or small crystals are suitable. When rapid combustion rates are essential, the oxide particle size must be more closely controlled. Submicron size particles may be employed in preparing pelletized gas generant compositions. Particle sizes of 0.7 to 0.9$\mu$ are particularly preferred in obtaining embodiments of the invention with burning rates within the desired range.

One skilled in the art will recognize that as the compositions of the instant invention are cooler burning than those of the prior art, giving nitrogen gas at combustion temperatures as much as 200° C. lower than earlier compositions, they require a hotter initiator to start the combustion process reliably. Although many equivalent initiators will occur to one skilled in the art, and the use of such equivalents is comprehended in the process of the invention both in the specification and appended claims, a particularly convenient and preferred initiator composition is one consisting of 5 to 25 weight percent, preferably about 10 weight percent boron; 75 to 95 weight percent, preferably about 85 weight percent potassium nitrate to which mixture is added 3 to 10 weight percent, preferably about 5 weight percent lead azide. Firing of the initiator composition may be by standard electrical means including any desired safety devices in the circuitry, such as spark gaps and/or ferrite resistors to prevent unwanted initiation from strong radio frequency or low voltage sources, at the option of the designer of the system.

While the gas generant compositions of this invention may be employed as the charge in conventional gas generators of the prior art, they are most advantageously employed in the particular gas generator construction described in the copending application of Gary Adams and Fred Schneiter referenced hereinabove.

This gas generator, which has a concentric configuration with the initiator at the center of a suitable reaction chamber surrounded by the gas generant compositions in suitable pelletized form which is in turn surrounded by wire screen, specially selected woven fiber glass cloth, and a second layer of wire screen covering radially arranged exit ports to a concentric diffusion chamber, the radially arranged exit ports of which are filtered by wire screen supporting an aluminum silicate fiber mat as a secondary filter, enables the advantageous characteristics of the inventive embodiments to be fully utilized.

Specifically, the pyrotechniqc material of the initiator, the gas generant composition and the primary filter are all contained in a hermetically sealed aluminum cartridge. This insures reliability of the generator over long periods. The aluminum cartridge is positioned in the combustion chamber of the generator. Upon initiation of combustion by the firing of the squib, the rising gas pressure ruptures the side wall areas of the cartridge adjacent the orifices of the combustion chamber. This allows gas to flow through the primary filter and out of the combustion chamber through the several orifices. The combustion chamber filter consists of one to three layers of a coarse screen adjacent to the wall of the chamber. This serves as a collecting area for gas to flow along the chamber wall to the chamber orifices and permits gas to flow evenly through the primary filter regardless of the proximity of a combustion chamber orifice. Inboard of the coarse screen are one or more layers of fiberglass woven fabric. The fiberglass fabric is selected for compatibility with the temperature in the combustion chamber during burning of the selected gas generant composition thereby to provide a tacky surface for particle entrapment that does not melt or erode away under the effects of the high temperature gas. An effect accompanying the production of the tacky surface appears to be a swelling of the fibers of the fiberglass fabric that reduces the porosity of the primary filter. It is believed that this swelling causes the primary filter to restrict the flow of gas and combustion residue out of the combustion chamber. This effect is believed to continue for only a short interval, up to about 3 milliseconds, but long enough to allow cooling and condensation of hot and molten particulate residue within the voids of the filter. Inside the multiple layers of the fiberglass cloth are multiple layers of fine mesh carbon steel screen. The layers of the fine mesh carbon steel provide a large relatively cool surface for condensation of combustion solids prior to encountering the multiple layers of fiberglass woven fabric. Approximately 95 percent of all solid products of combustion are trapped in the combustion chamber filter. It is noted that outside of the combustion chamber, the velocity of the gases that are generated becomes so high that trapping of the products of combustion in that region becomes exceedingly difficult.

An added benefit of the fiberglass cloth is that under the high temperature environment, the glass reacts with caustic sodium oxide, $Na_2O$, by-product of the combustion process, to form innocuous sodium silicate.

The secondary filter is comprised of multiple wraps of wire mesh which serves to cool the gas and provide surface for condensation of solid particles. Surrounding the wire mesh filter pack are one or more wraps of the aluminum silicate blanket. The aluminum silicate blanket serves two distinct functions. One of these functions is to react with particles of sodium oxide which come into intimate contact with the second filter to form sodium silicate.

Surrounding the aluminum silicate blanket are several wraps of fine mesh screen which provide structural support for the aluminum silicate blanket. It is noted that aluminum silicate blanket is porous, has very little strength, and tends to disintegrate under the effects of the high velocity gas stream. The filter elements, however, retain the solids entrapped. The fine mesh outer screen is used to trap these aluminum silicate filter particles and prevent them from being carried out of the exit orifices of the housing with the clean combustion gases.

One skilled in the art will recognize that the successful initiation of combustion of any gas generant requires the use of an adequate quantity of initiator to insure that sufficient hot combustion products of the initiator contact enough of the exposed generant surface to kindle a self sustaining flame front. The selection of such amounts by a number of simple graduated experiments for any initiator-gas generant combination is well within the skill of a journeyman in the art. In the case of the compositions of the instant invention from 0.02 g to 0.03 g, preferably from 0.024 g to 0.026 g of the boron, potassium nitrate, lead azide initiator described herein per gram of gas generant composition may be employed.

One skilled in the art will also recognize that although the combustion temperature of the instant compositions is significantly lower than those of the prior art, in order to reduce the gas temperature in the crash bag to a level tolerable by the vehicle occupants, additional cooling means must be provided. In addition to the cooling method of the aforementioned Schneiter and Adams copending application, the standard cooling means, normally layers of woven metal mesh which additionally may serve as conventional filtration means may be employed. One skilled in the art will also recognize that the effluent gases from combustion of the instant composition may contain sufficient alkaline material to cause burns or discomfort to someone coming in contact therewith. In addition to the fiberglass cloth of the aforementioned Schneiter and Adams application, the conventional neutralizers of the prior art, conveniently carbonate salts, may be employed to adjust the pH of the effluent gases from combustion of the compositions of this invention to levels tolerable by humans, conveniently pH levels below 10.0.

The following examples further illustrate the best mode contemplated by the inventors for the practice of their invention.

EXAMPLES 1 through 7

Gas generant compositions are prepared by dry mixing and remote tableting of the ingredients tabulated in quantities indicated. Burn rate data on pressed pellet and other pertinent information are recorded.

| Example No. | Formulation (Wt. %) | | | | Burn Rate in/sec at psia | Remarks |
|---|---|---|---|---|---|---|
| | $NaN_3$ | $Fe_2O_3$ | $MoS_2$ | S | | |
| 1 | 71 | 29 | — | — | No data | Poor pelletizing (no lubrication) |
| 2 | 70 | 26* | 2 | 2 | .421 at 1060 | Trace $NaN_3$ in residue |
| 3 | 70 | 26 | 2 | 2 | .938 at 1068 | Trace $NaN_3$ in residue |
| 4 | 70 | 28 | 2 | — | .728 at 1057 | Trace $NaN_3$ in residue |
| 5 | 66 | 30 | 2 | 2 | .955 at 1056 | Good pressing-No $NaN_3$ in residue |
| 6 | 66 | 32 | 2 | — | .630 at 1052 | Good pressing-No $NaN_3$ in residue |
| 7 | 66 | 31 | 2 | 1 | .801 at 1060 | Good pressing-No $NaN_3$ in residue |

*normal size iron oxide pigment ~5.5μ all other tests used "transparent iron oxide (0.7 to 0.9μ particles).

EXAMPLE 8

The pelletized gas generant composition of Example 5 is inserted into a passenger air bag style inflator of the type described in the Adams and Schneiter copending application referenced hereinabove, ignited and the gases so generated collected in an evacuated collection chamber with a volume of approximately 300 liters. The pressure of the gases within the gas generator is measured as a function of time after ignition. FIG. 1 represents the data so obtained graphically.

EXAMPLE 9

Figure 2:
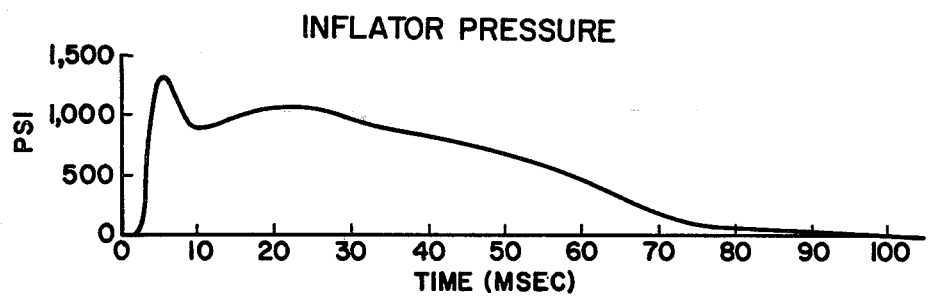
FIG. 2 is a representation of the time pressure relationship of a burn similar to FIG. 1 with expulsion of gases into crash bags.
Figure 3:
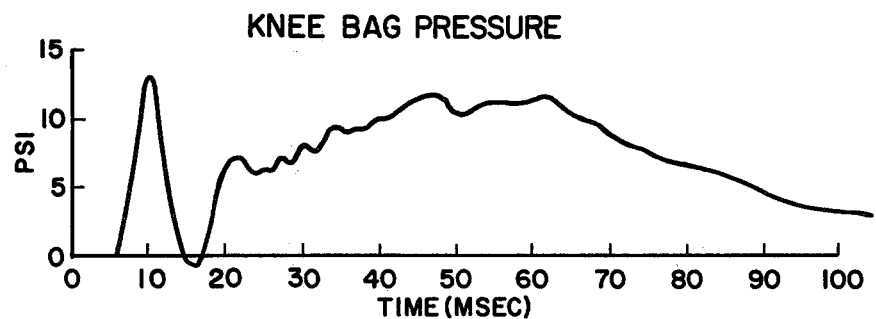
FIG. 3 represents a pressure time relationship developed during inflation of a passenger knee area crash bag by a burn similar to that of FIG. 2.
Figure 4:
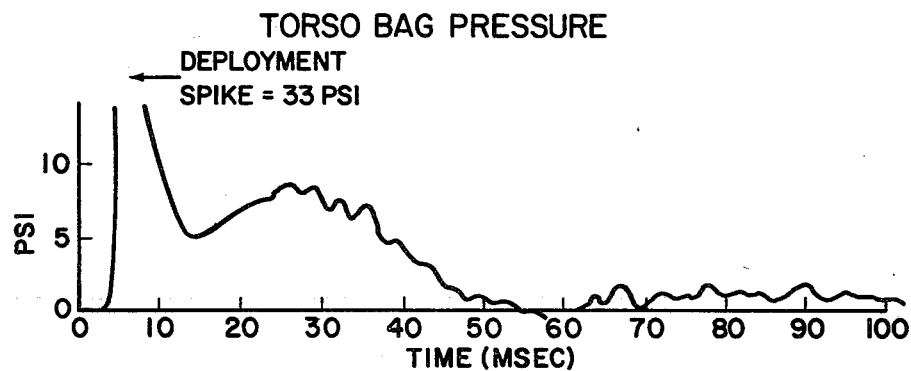
FIG. 4 represents a pressure time relationship developed during inflation of a passenger torso area crash bag by a burn similar to that of FIG. 2.

A passenger air bag inflator similar to that of Example 8 is charged with the pelletized gas generant composition of Example 5, ignited and the gas expelled into standard passenger knee and torso bags. The gas pressure in the generator at various times is set forth in FIG. 2, the gas pressure in the knee bag at various times is set forth in FIG. 3 and the gas pressure in the torso bag at various time intervals is set forth in FIG. 4.

EXAMPLE 10

Figure 5:
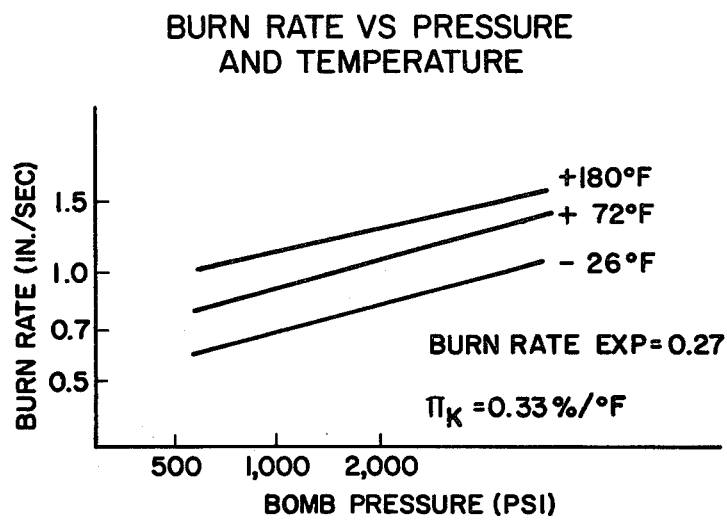
FIG. 5 represents the variation of burn rate in a closed bomb with pressure and temperature at ignition of gas generant of Example 5.

Strands of the compressed gas composition of Example 5 are ignited in a closed vessel at various pressures and initial temperatures. The variation of the burn rate of the strands with pressure and with initial temperature at ignition is illustrated in FIG. 5.

The strands used in this test are cylindrical, approximately 0.5 in. in diameter and 0.6 to 0.8 in. long. They are ignited on one end. The sides of the strand are inhibited by wrapping with plastic tape to prevent side burning.

EXAMPLE 11

Comparison of combustion characteristic data is determined by burning compressed strands of the gas generant compositions of Example 5(A) and a conventional sodium azide-molybdenum-sulfide-sulfur gas generant as described in U.S. Pat. No. 3,741,585(B).

| Composition | A | B |
| --- | --- | --- |
| Burn rate (in/sec at 1000 psia) | 0.97 | 1.3 |
| Burn rate exponent | 0.27 | 0.41 |
| Temperature sensitivity ($\pi_K$) | 0.33 | 0.33 |
| Combustion temperature (°K.) | 1,298 | 1,470 |

The subject matter which applicants regard as their invention is particularly pointed out and distinctly claimed as follows:

1. A solid nitrogen gas generant consisting of 60 to 80 weight percent alkali metal azide, 2 to 35 weight percent oxide selected from the group consisting of iron oxide, cobalt oxide, nickel oxide, palladium oxide, silicon oxide and mixtures thereof, 2 to 26 weight percent molybdenum disulfide and up to 6 weight percent sulfur.

2. A nitrogen gas generant as defined in claim 1 wherein the oxide is iron oxide.

3. A nitrogen generant as defined in claim 2 wherein the iron oxide is $Fe_2O_3$.

4. A nitrogen gas generant as defined in claims 1, 2 or 3 wherein the alkali metal azide is sodium azide.

5. A nitrogen gas generant as defined in claim 1 consisting of 66 weight percent sodium azide, 30 weight percent ferric oxide, 2 weight percent molybdenum disulfide and 2 weight percent sulfur.

6. A method for the generation of substantially pure, substantially particle free nitrogen gas at pressures below 1500 psia when generation is initiated at normal room temperature which comprises:
   (a) treating a nitrogen gas generant composition as defined in claim 1 with hot combustion products of an initiator composition comprising a mixture of 5 to 25 weight percent boron and 75 to 95 weight percent potassium nitrate to which mixture is added 3 to 10 weight percent lead azide the combustion products of said initiator composition being of sufficient quantity to induce sustained combustion of said nitrogen gas generant composition; and
   (b) passing the products of combustion of said nitrogen gas composition through cooling, filtration and pH adjustment means.

7. An improved nitrogen gas generator based on alkali metal azides containing reactants for combination with the free alkali metals liberated by decomposition of alkali metal azides to produce nitrogen, wherein the improvement comprises the reactants for combination with said free alkali metals being a mixture of:
   (a) oxides selected from the group consisting of iron oxides, cobalt oxide, nickel oxide, palladium oxide, silicon oxide and mixtures thereof;
   (b) molybdenum disulfide; and
   (c) sulfur.

* * * * *